United States Patent
Moto et al.

(10) Patent No.: US 10,585,261 B2
(45) Date of Patent: Mar. 10, 2020

(54) OPTICAL DRIVING MECHANISM

(71) Applicant: TDK TAIWAN CORP., Yangmei Taoyuan (TW)

(72) Inventors: Ichitai Moto, Yangmei Taoyuan (TW); Chih-Wei Weng, Yangmei Taoyuan (TW); Sin-Jhong Song, Yangmei Taoyuan (TW)

(73) Assignee: TDK TAIWAN CORP., Yangmei, Taoyuan (TW)

( * ) Notice: Subject to any disclaimer, the term of this patent is extended or adjusted under 35 U.S.C. 154(b) by 25 days.

(21) Appl. No.: 15/966,377

(22) Filed: Apr. 30, 2018

(65) Prior Publication Data

US 2018/0335600 A1 Nov. 22, 2018

Related U.S. Application Data

(60) Provisional application No. 62/508,581, filed on May 19, 2017.

(30) Foreign Application Priority Data

Mar. 15, 2018 (CN) .............................. 2018 1 021592

(51) Int. Cl.
*G02B 7/02* (2006.01)
*H02N 2/02* (2006.01)
*G02B 27/64* (2006.01)
*G02B 7/10* (2006.01)
(Continued)

(52) U.S. Cl.
CPC .............. *G02B 7/023* (2013.01); *G02B 7/021* (2013.01); *G02B 7/08* (2013.01); *G02B 7/10* (2013.01); *G02B 27/646* (2013.01); *H02N 2/0055* (2013.01); *H02N 2/025* (2013.01)

(58) Field of Classification Search
CPC ...... H04N 5/2254; H04N 5/2253; G02B 7/08; G02B 27/646; G02B 7/04; G02B 7/09; G02B 7/102; G02B 7/10; G02B 7/023; B60R 2011/008; B60R 2011/0084; H02K 41/031; H02K 41/0356; H02K 11/215; H02K 15/03; H02K 1/2706; H02N 2/026;
(Continued)

(56) References Cited

U.S. PATENT DOCUMENTS

2015/0346584 A1* 12/2015 Kim ..................... H04N 5/2254
348/373
2016/0161828 A1* 6/2016 Lee ......................... G03B 3/10
359/824

* cited by examiner

*Primary Examiner* — Alicia M Harrington
(74) *Attorney, Agent, or Firm* — Muncy, Geissler, Olds & Lowe, P.C.

(57) ABSTRACT

An optical driving mechanism is provided, configured to force an optical element, including a base, a movable portion, and a driving portion. The movable portion is disposed and connected to the base. The movable portion includes a holder configured to sustain the optical element, a magnetic element, and a fixing member. The magnetic element and the fixing member are affixed to the holder, wherein the fixing member has a permeable material. The driving portion is configured to force the movable portion to move relative to the base, wherein the driving portion includes a piezoelectric element and a support member connecting thereto. The piezoelectric element and the support member are disposed on the base and connected to the movable portion. The fixing member makes contact with the support member via a magnetic attraction force between the magnetic element and the fixing member.

14 Claims, 15 Drawing Sheets

(51) Int. Cl.
*G02B 7/08* (2006.01)
*H02N 2/00* (2006.01)

(58) Field of Classification Search
CPC ........ H02N 2/025; H02N 2/0055; H02N 2/02;
H02N 2/04
See application file for complete search history.

OPTICAL DRIVING MECHANISM

CROSS REFERENCE TO RELATED APPLICATIONS

This application claims the benefit of U.S. Provisional Application No. 62/508,581, filed on May 19, 2017, and China Patent Application No. 201810211592.X, filed on Mar. 15, 2018, the entirety of which are incorporated by reference herein.

BACKGROUND OF THE INVENTION

Field of the Invention

The application relates in general to an optical driving mechanism, in particular to an optical driving mechanism for driving a holder and an optical element via a piezoelectric element.

Description of the Related Art

Thanks to ongoing technological developments, recent electronic devices (such as tablet computers and smartphones) usually include a lens module capable of aiding in photography or recording video, or are even equipped with dual lens modules, bringing users a wealth of visual enjoyment. However, an image may come out blurry if the user shakes the lens module in the electronic device when using it. To improve image quality, it is increasingly important to design a smaller and effectively shockproof lens module. At present, a piezoelectric impact driving mechanism (or a smooth impact driving mechanism) is provided in the electronic device to correct for lens shake and provide a proper focus. Conventional piezoelectric actuators mostly rely on springs to hold the piezoelectric components, but the springs deform easily when they are subjected to strong external impact. This may cause the springs to be unable to hold the piezoelectric component stably, even to the point at which the entire spring is no longer in contact with the piezoelectric component, so that the optical driving mechanism cannot operate normally. People pursue high quality and high-quality electronic products, whereby it is increasingly important to design an optical driving mechanism which is shockproof and highly stable inside the electronic device.

BRIEF SUMMARY OF INVENTION

To address the deficiencies of conventional products, an embodiment of the invention provides an optical driving mechanism, configured to force an optical element, comprising a base, a movable portion, and a driving portion. The movable portion is disposed and connected to the base, and includes a holder configured to sustain the optical element, a magnetic element, and a fixing member. The magnetic element and the fixing member are affixed to the holder, wherein the fixing member has a permeability material. The driving portion is configured to force the movable portion to move relative to the base, wherein the driving portion includes a piezoelectric element and a support member connecting thereto. The piezoelectric element and the support member are disposed on the base and connected to the movable portion. The fixing member makes contact with the support member via a magnetic attraction force between the magnetic element and the fixing member.

In some embodiments, the fixing member has a fixing portion, a corresponding portion and a contact portion, the fixing portion is affixed to the holder, the corresponding portion and the magnetic element are attracted to each other via the magnetic attraction force, and the contact portion makes contact with the support member, wherein the corresponding portion is situated between the fixing portion and the contact portion.

In some embodiments, the magnetic element is fully covered by the fixing member in a direction that is perpendicular to the optical axis of the optical element. In some embodiments, the movable portion further includes a sliding member disposed on the holder and in contact with the support member. In some embodiments, the sliding member, the fixing member and the support member form at least three contact areas. In some embodiments, the optical driving mechanism further comprises a plurality of fixing members disposed on the side of the holder, and the fixing members and the sliding member form at least three contact areas.

In some embodiments, the fixing member has an L-shaped structure, and one end of the L-shaped structure is corresponding to another magnetic element on the holder. In some embodiments, the optical driving mechanism further comprises an alignment element that is adjacent to the fixing member and that corresponds to the magnetic element.

In some embodiments, the optical driving mechanism further comprises a circuit board assembly disposed on the base, and the circuit board assembly and the driving portion are located on the same side of the base, wherein the alignment element is disposed on the circuit board assembly. In some embodiments, the piezoelectric element is in direct contact with the circuit board assembly.

In some embodiments, the optical driving mechanism is configured to drive a plurality of optical elements. The optical driving mechanism further comprises a plurality of movable portions and a plurality of driving portions. The base has a substantially rectangular structure. The driving portions and the movable portions are disposed on the base. The driving portions are arranged on the same side of the base and situated at two adjacent corners of the base.

Another embodiment of the invention provides an optical driving mechanism, configured to drive an optical element, comprising: a base, a movable portion, and a driving portion. The base includes a first magnetic element. The movable portion is connected to the base and includes a holder configured to sustain the optical element and a second magnetic element disposed on the holder, wherein the second magnetic element is corresponding to the first magnetic element. There is a magnetic repulsion force between the second magnetic element and the first magnetic element. The driving portion is configured to drive the movable portion to move relative to the base, and the driving portion includes a piezoelectric element and a support member. The support member is connected to the piezoelectric element, wherein the piezoelectric element and the support member are disposed on the base and connected to the movable portion. The holder makes contact with the support member via the magnetic repulsion force.

In some embodiments, the movable portion further includes a sliding member disposed on the holder and in contact with the support member. In some embodiments, the base further includes a plurality of first magnetic elements, the movable portion further includes a plurality of second magnetic elements, each the first magnetic element is corresponding to each second magnetic element, and there is a plurality of magnetic repulsion forces in different directions between the first magnetic elements and the second magnetic elements.

In some embodiments, the optical driving mechanism is configured to drive a plurality of optical elements. The optical driving mechanism further comprises a plurality of movable portions and a plurality of driving portions. The base has a substantially rectangular structure, the driving portions and the movable portions are disposed on the base, and the driving portions are arranged on the same side of the base and situated at two adjacent corners of the base.

In some embodiments, the optical driving mechanism is configured to drive a plurality of optical elements. The optical driving mechanism further comprises a plurality of movable portions and a plurality of driving portions. The base has a substantially rectangular structure, the driving portions and the movable portions are disposed on the base, and the driving portions are arranged on the different sides of the base and situated at two diagonal corners of the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Embodiment 1

Figure 1:
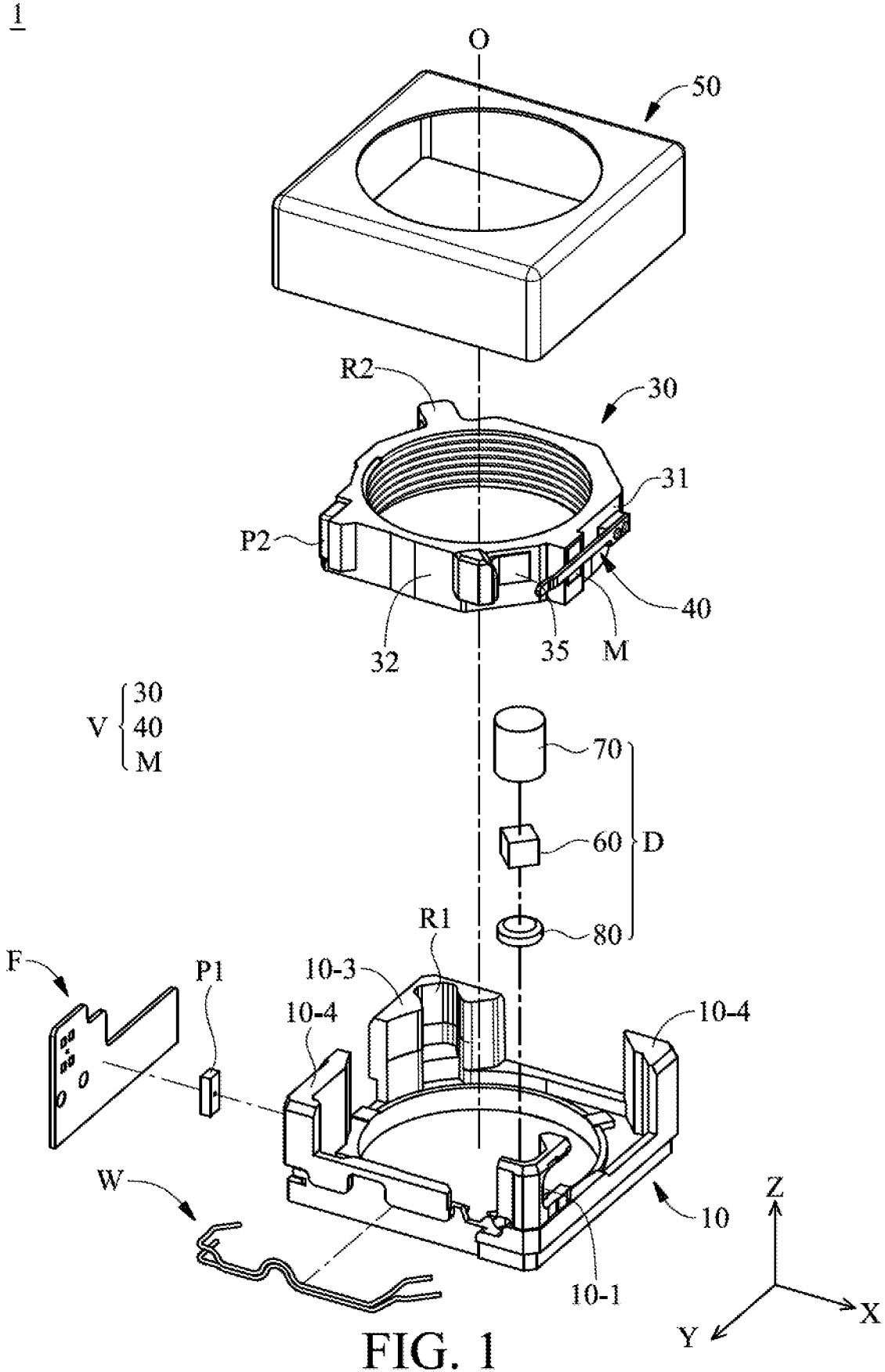
FIG. 1 is an exploded view of an optical driving mechanism according to an embodiment of the invention.

FIG. 1 is an exploded view of an optical driving mechanism 1 according to an embodiment of the present invention. The optical driving mechanism 1 is, for example, a mechanism that can drive and sustain an optical element (such as a lens; not shown), and can be disposed inside an electronic device (such as a camera, tablet, or mobile phone). The optical element can be moved by the optical driving mechanism 1 relative to an image sensor in the electronic device to achieve auto-focusing (AF) or optical image stabilization (OIS) for improving image quality.

As shown in FIG. 1, the optical driving mechanism 1 primarily comprises a housing 50, a base 10, a movable portion V, and a driving portion D. The movable portion V and the driving portion D are disposed on the base 10 and are located in and protected by the housing 50. The movable portion V includes a holder 30 that can sustain an optical element (for example, an optical lens), wherein an image sensor (not shown; for example, can be disposed below the base 10) in the electronic device can receive the light from the outside through the optical element (from the direction of the optical axis O of the optical element), to acquire the image.

Figure 2:
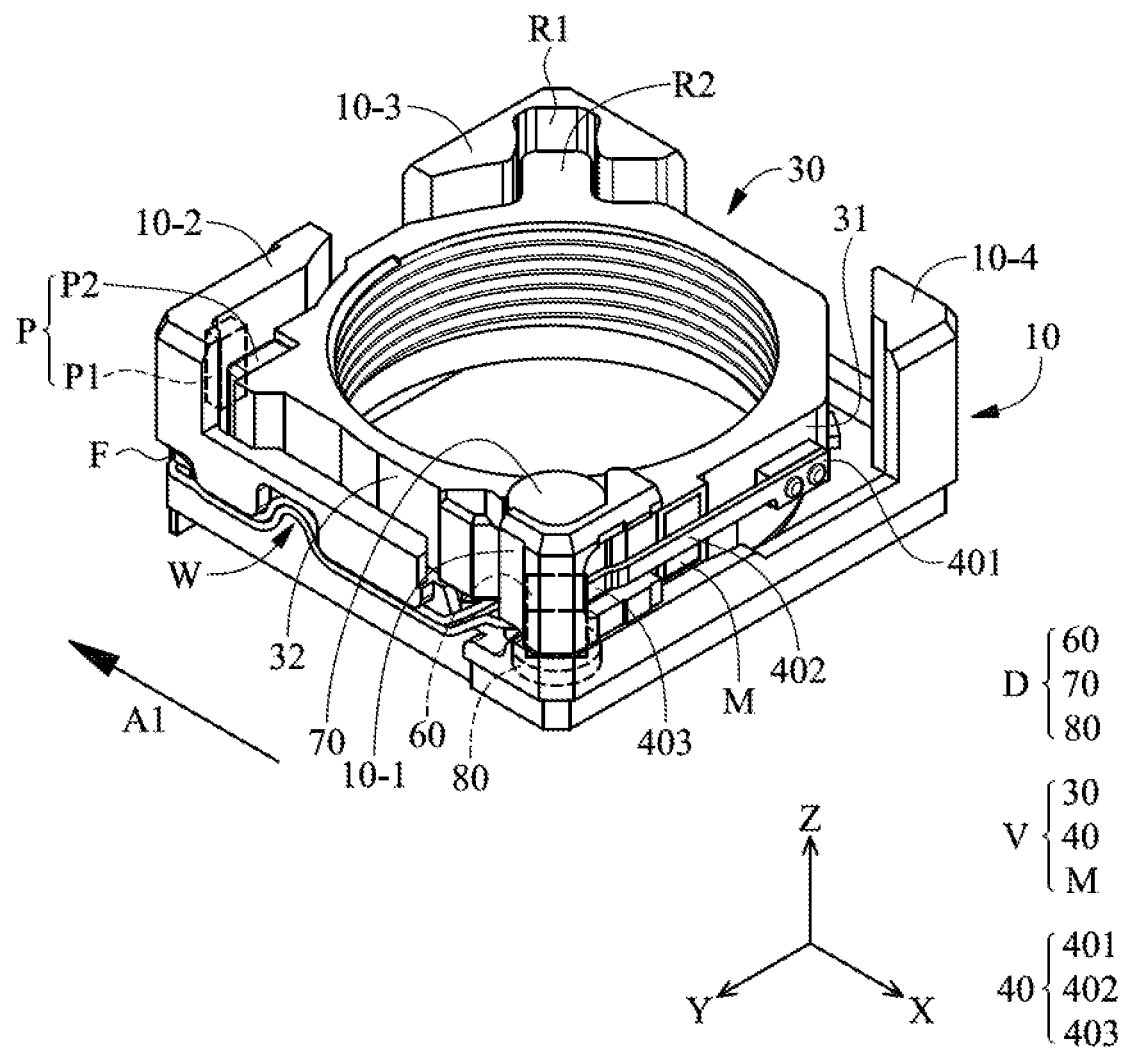
FIGS. 2-3 are schematic diagrams of the optical driving mechanism in FIG. 1 after assembly (the housing 50 is omitted).

Please refer to FIGS. 1 to 2, wherein FIG. 2 is a schematic diagram of the optical driving mechanism 1 of FIG. 1 after assembly (the housing 50 is omitted). The movable portion V is connected to the driving portion D. The movable portion V includes the holder 30, a magnetic element M, and a fixing member 40. The driving portion D includes a piezoelectric element 60 and a support member 70 and a weight member 80. It should be noted that, the driving portion D in this embodiment is, for example, a piezoelectric impact driving assembly (or Smooth Impact Driving Assembly, SIDM Assembly), and a driving signal (for example, a driving current) applied to the piezoelectric element 60 in the driving portion D can cause the piezoelectric element 60 to deform, for example, extend or shorten, so as to drive the movable portion V (including the holder 30 and the optical element carried by the holder 30) to move relative to the base 10, to achieve optical focus and shake compensation. The connection relationship between the movable portion V, the driving portion D and the base 10 is described in detail below.

Please also refer to FIG. 2, the driving portion D and the moving portion V are disposed on the base 10 and surrounded by the four protrusions (or studs) 10-1, 10-2, 10-3 and 10-4 of the base 10. The support member 70 of the driving portion D has a cylindrical structure sandwiched between the holder 30 and the protrusion 10-1 and is in contact with the fixing member 40. The fixing member 40 is, for example, a rod-shaped elastic sheet having or made of permeable material and is disposed on the lateral side 31 of the holder 30 to press the support member 70 against the holder 30 (for example, pressing the support member 70 on the side edge 31), so that the support member 70 is stably abutted against the holder 30.

Figure 3:
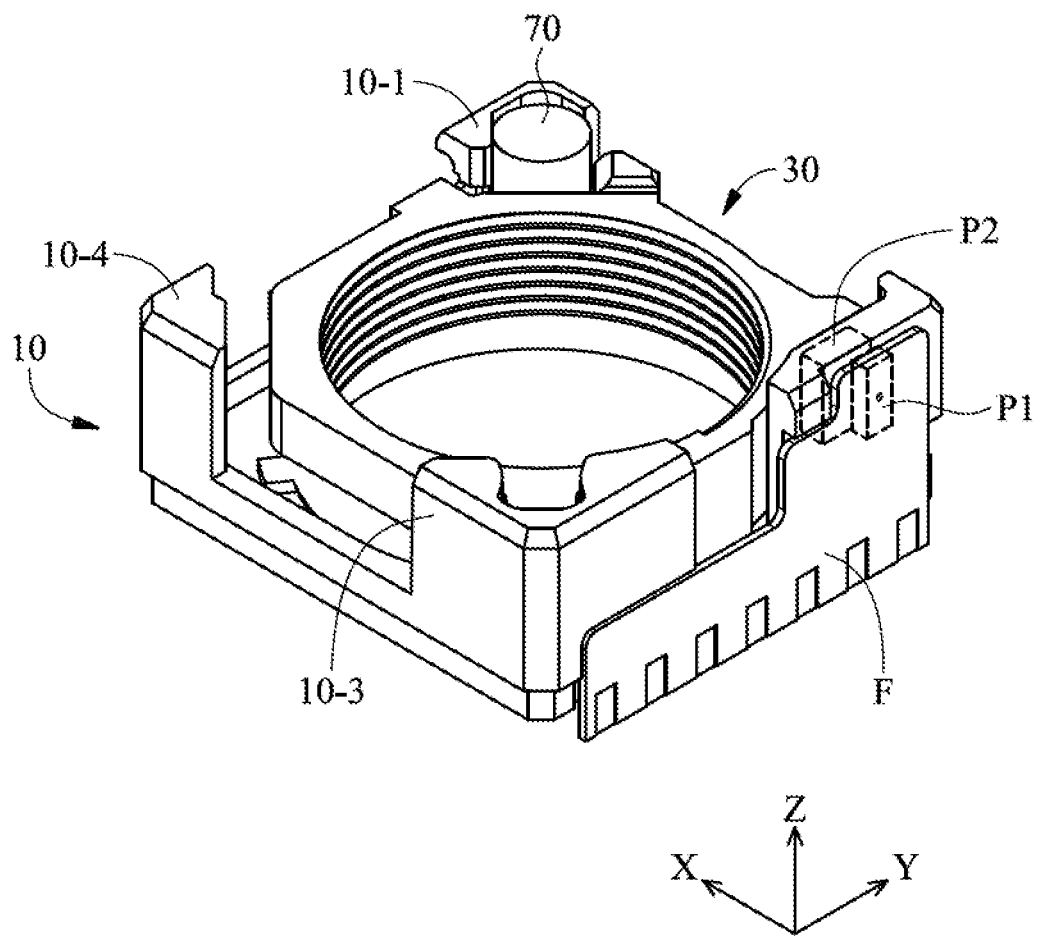

In addition, as shown in FIG. 3, on the other side of the base 10 (i.e., with respect to the side on which the fixing member 40 and the driving portion D are provided), a circuit board assembly F is provided, which is, for example, a flexible printed circuit board assembly (FPCBA) is connected to the piezoelectric element 60 of the driving portion D by a wire W, and can apply a driving signal (for example, a current) to the piezoelectric element 60 so as to be elongated or shortened to move the movable portion V relative to the base 10, so as to achieve the purpose of focusing and shockproof.

It should be noted that the protrusion 10-3 of the base 10 has a U-shaped groove R1, and the holder 30 has a protruding part R2. The groove R1 and the protruding part R2 match each other. When the holder 30 is assembled on the base 10, the matching (or engaging) through the groove R1 and the protrusion R2 can provide a good positioning mechanism, and can improve the assembly tightness of the optical driving mechanism 1.

In the present embodiment, the optical driving mechanism 1 further comprises an alignment assembly (or positioning assembly) P including two alignment elements P1 and P2. As shown in FIGS. 2 to 3, the alignment elements P1 and P2 are corresponding to each other and respectively disposed on the base 10 and the movable portion V (for example, respectively disposed on the side of the protrusion 10-2 of the base 10 and the holder 30 of the movable portion V). The alignment element P1 may be a permanent magnet or a Hall effect sensor, wherein the alignment element P2 is the other of the two. The Hall effect sensor may determine the position of the permanent magnet by detecting changes in the magnetic field of the permanent magnet, so that it is possible to detect the displacement of the movable portion V relative to the base 10 due to the vibration. In another embodiment, other types of alignment elements/components, such as a magnetoresistive sensor (MRS) or an optical sensor, may also be used to detect the relative position of movable portion V and the base 10.

Regarding the driving portion D driving the movable portion V to move relative to the base 10, for example, when an appropriate drive signal is applied to the piezoelectric element 60 to be elongated, the support member 70 on the piezoelectric element 60 follows the direction of the optical axis O (Z axis) moves upwards, and the piezoelectric element 60 and the support member 70 move the movable portion V in the direction of the optical axis O to a predetermined height (position); when an appropriate drive signal is applied again to the piezoelectric element 60 and the piezoelectric element 60 shortens rapidly, the support member 70 returns to the initial position, and the movable portion V can be maintained at the aforementioned predetermined height. The position of the movable portion V relative to the base 10 can be adjusted by repeatedly performing the drive signal of elongating and shortening of the voltage element 60, so that the optical driving mechanism 1 functions well at focusing and at compensation for lens shake.

It should be noted that a magnetic element M (for example, a magnet) is provided on the side 31 of the base 10 that faces the fixing member 40. There is a magnetic attraction force between the fixing member 40 containing permeable material and the magnetic element M. This magnetic attraction force will cause the fixing member 40 to more stably hold the support member 70 perpendicular to the optical axis O (in the arrow direction A1). More specifically, the fixing member 40 may be divided into at least three portions: a fixed portion 401, a corresponding portion 402 and a contact portion 403. The fixed portion 401 and the holder 30 are affixed to each other, and the corresponding portion 402 attracts the magnetic element M through the aforementioned magnetic attraction force, and the contact portion 403 is in contact with the support member 70. In this way, when the optical driving mechanism 1 provided in the electronic device is subjected to a strong external impact, the fixed member 40 can be held firmly by the magnetic attraction force between the fixing member 40 and the magnetic element M. Therefore, the support member 70 of the driving portion D can be held firmly by the fixing member 40. Situations where the fixing member 40 cannot stably hold the support member 70 due to a permanent deformity are prevented.

Figure 4:
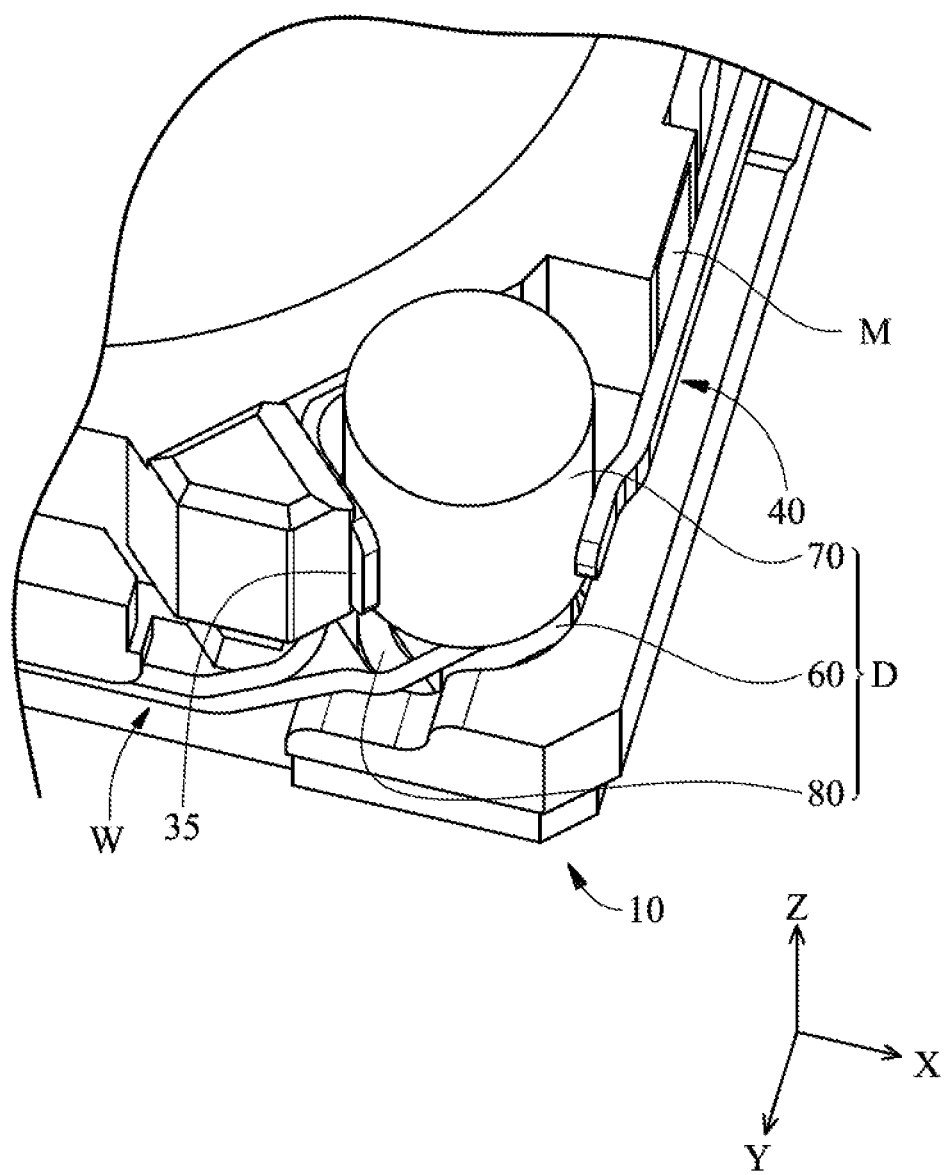
FIG. 4 is a partial schematic diagram of another viewing angle in FIG. 2.

FIG. 4 is a partial schematic view of another view of FIG. 2, wherein the protrusion 10-1 of the base 10 is omitted. As can be seen from FIGS. 1 and 4, a sliding member 35 (having a V-shaped structure) is provided on the side of the holder 30 and is in contact with the support member 70. The sliding member 35 has a smooth surface. At least three contact areas are formed between the fixing member 40 and the sliding member 35 and the support member 70 to stably hold the support member 70 because the fixing member 40 and the sliding member 35 are in contact with the support member 70. Furthermore, the driving portion D includes the aforementioned weight member 80 which is disposed below the piezoelectric element 60 to protect it. The weight member 80 may be made of, for example, a metal material and can provide the effect of stabilizing the entire driving portion D.

As described above, a magnetic attraction force generated by the fixing member 40 and the magnetic member M acts on the holder 30, and the driving portion D (and the support member 70 thereof) is pressed against the holder member 30 by the fixing member 40, to prevent or reduce permanent deformation of the fixing member 40 (due to external impact) so as not to hold or contact the driving portion D. This greatly improves the optical driving mechanism 1.

Embodiment 2

Figure 5:
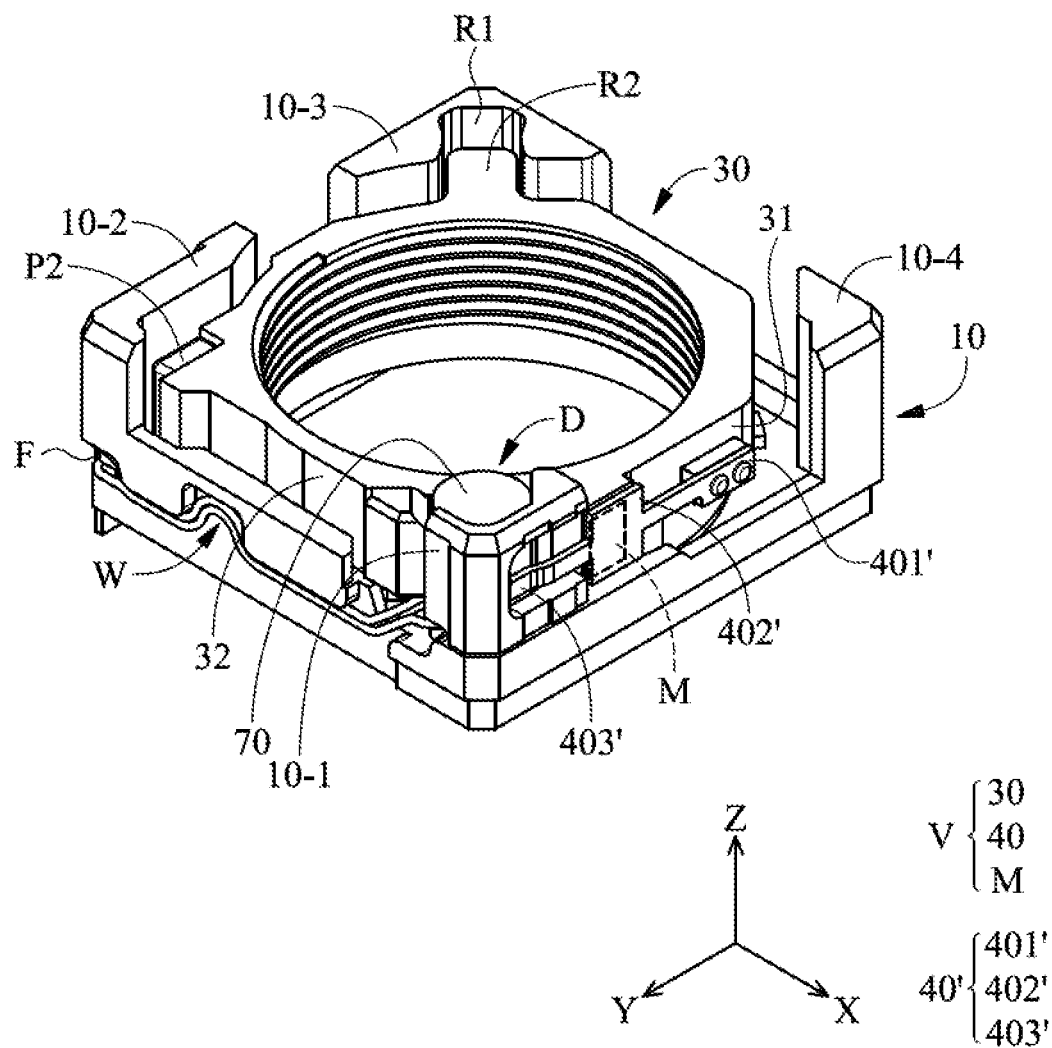
FIG. 5 is a schematic diagram of an optical driving mechanism according to another embodiment of the invention.

FIG. 5 is a schematic view of an optical driving mechanism 2 according to another embodiment. The main difference between the present embodiment and the foregoing embodiment (FIG. 1) is that the fixing member 40' of the optical driving mechanism 2 is different from the aforementioned fixing member 40, and the housing 50 is omitted for clear to see the internal structure of the optical driving mechanism 2. Other components are the same or substantially the same or only a slight difference in appearance, which are not described here again. Compared to the aforementioned fixing member 40, the corresponding portion 402' of the fixing member 40' has a larger area, and its width in the direction of the optical axis O (Z-axis) is greater than that of the fixing portion 401' and the contact portion 403'. The corresponding portion 402' completely covers the magnetic element M (in the direction perpendicular to the optical axis O). A stronger magnetic attraction force can be generated between the fixing member 40' and the magnetic element M by having a larger corresponding area, so that the support member 70 can be more firmly clamped by the fixing member 40'.

Embodiment 3

Figure 6A:
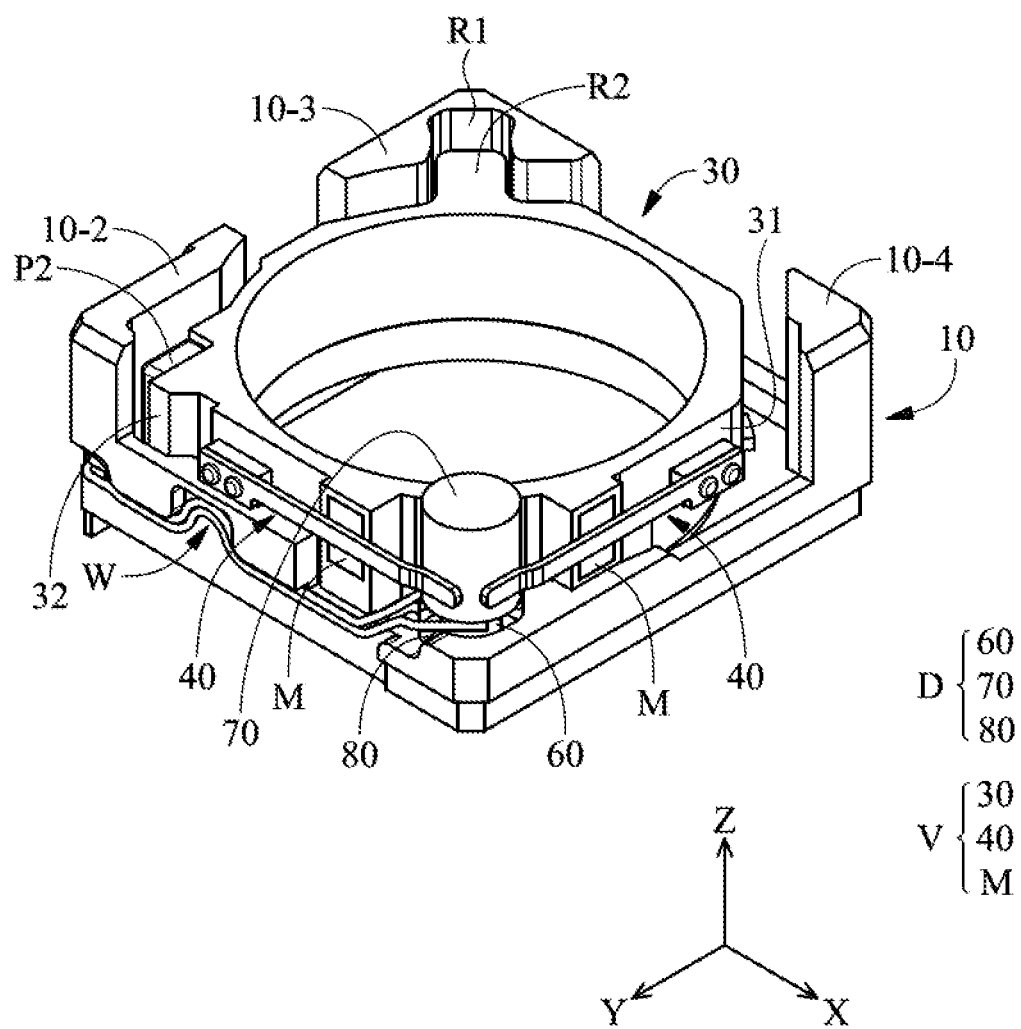
FIGS. 6A-6B are schematic diagrams of an optical driving mechanism according to another embodiment of the invention.
Figure 6B:
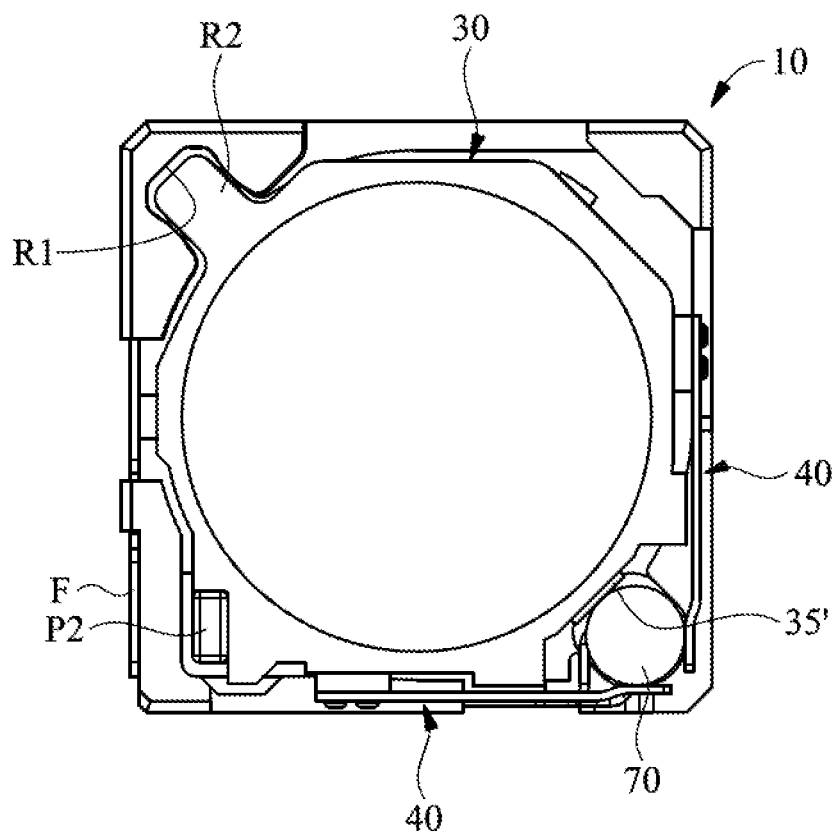

In another embodiment, as shown in FIGS. 6A-6B, an optical driving mechanism 3 further comprises two fixing members 40 and two magnetic elements M which correspond. One fixing member 40 and one magnetic element M are disposed on the side 31 of the holder 30, and another fixing member 40 and another magnetic element M are disposed on the side 32 of the holder 30, wherein the sides 31 and 32 are adjacent to each other. The magnetic attraction forces generated between the two sets of fixing members 40 and the magnetic elements M will allow the fixing members 40 to more stably hold the support member 70. In addition, as shown in FIG. 6B, two fixing members 40, a sliding member 35' (having a strip structure) and the support member 70 form at least three contact areas, so as to improve the stability of clamping the support member 70. Moreover, the base 10 of the present embodiment does not have the aforementioned protrusion 10-1 (FIG. 1), which only has three protrusions 10-2, 10-3 and 10-4. Thus, the overall volume of the mechanism can be reduced.

Embodiment 4

Figure 7:
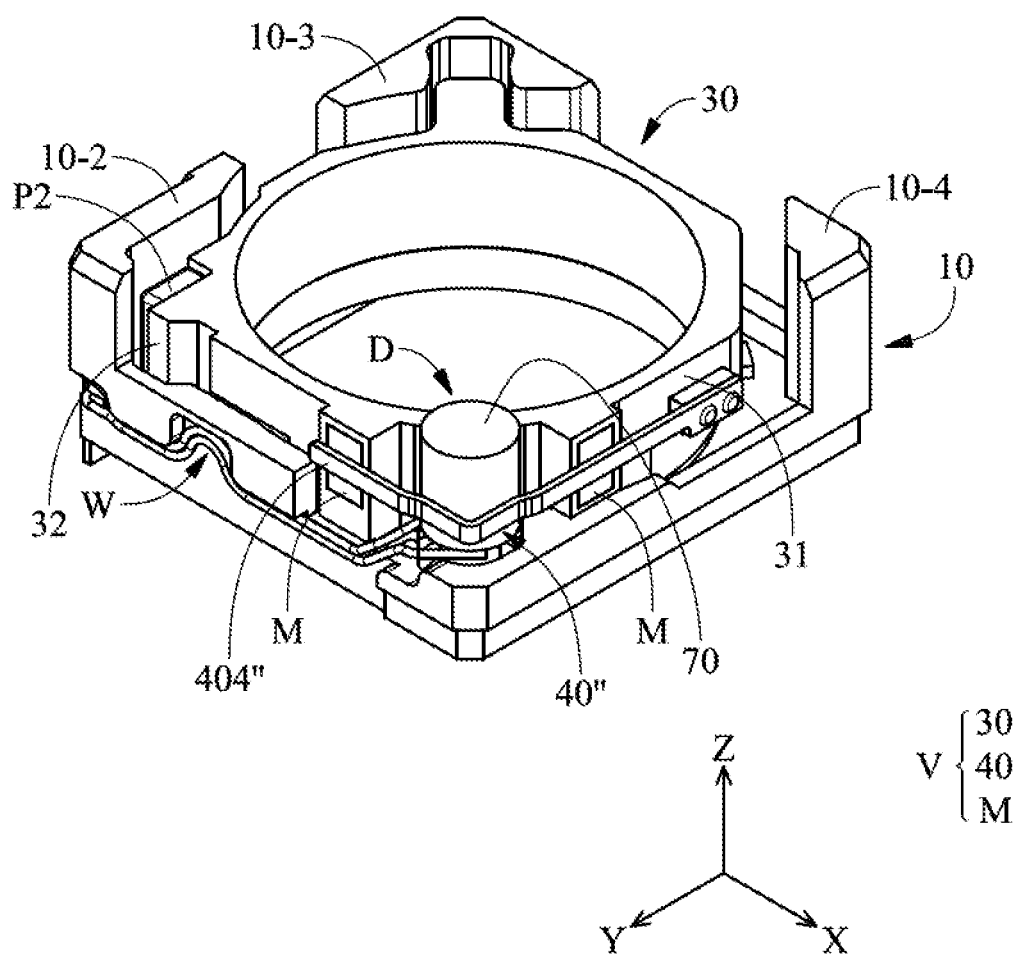
FIG. 7 is a schematic diagram of an optical driving mechanism according to another embodiment of the invention.

In another embodiment, as shown in FIG. 7, an optical driving mechanism 4 comprises an L-shaped fixing member 40" that forms at least two contact areas with the support member 70. One end of the L-shaped structure of the fixing member 40" is formed with another corresponding portion 404", and a magnetic attraction force is generated between the corresponding portion 404" and the other magnetic element M on the holder 30, to stabilize the driving portion D.

Embodiment 5

Figure 8:
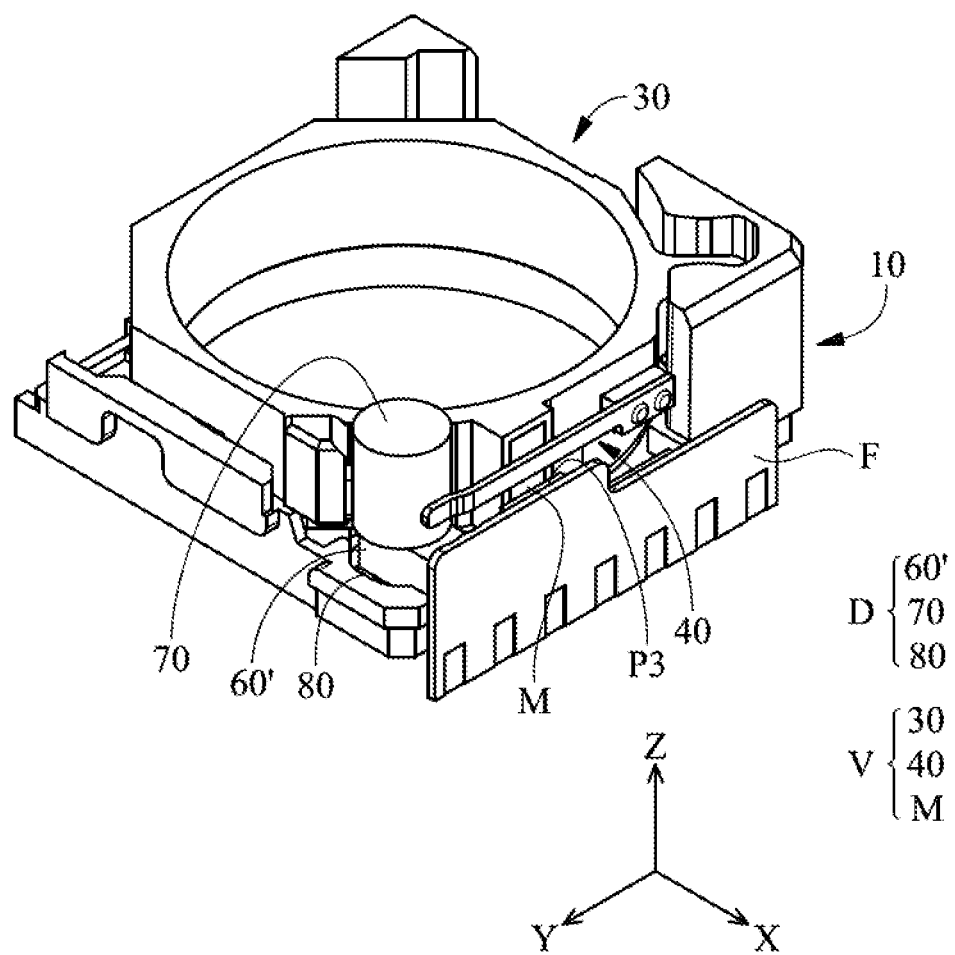
FIG. 8 is a schematic diagram of an optical driving mechanism according to another embodiment of the invention.

In another embodiment, as shown in FIG. 8, the driving portion D and the circuit board assembly F of an optical driving mechanism 5 are disposed on the same side of the holder 30, and the piezoelectric element 60' is connected to the circuit board assembly F on the base 10 (the piezoelectric element 60' may be in direct contact with the circuit board assembly F to save on wire W as in the first embodiment). It should be noted that alignment elements P3 on the circuit board assembly F and the magnetic element M constitute an alignment assembly P for determining the relative position of the movable portion V and the base 10. In this way, the magnetic element M has two functions: one is to generate magnetic attraction force with the fixing member 40 so that the fixing member 40 can stabilize the support member 70; and the other is to align with the alignment member P3 to constitute the alignment assembly P, which is configured to detect the relative position of the movable portion V and the base 10. With this arrangement, not only can the overall volume of the optical driving mechanism 5 be reduced (because both the drive portion D and the circuit board assembly F are provided on the same side of the holder 30), but the magnetic member M can also be used as an alignment element, to save on the number of alignment components.

Embodiment 6

Figure 9:
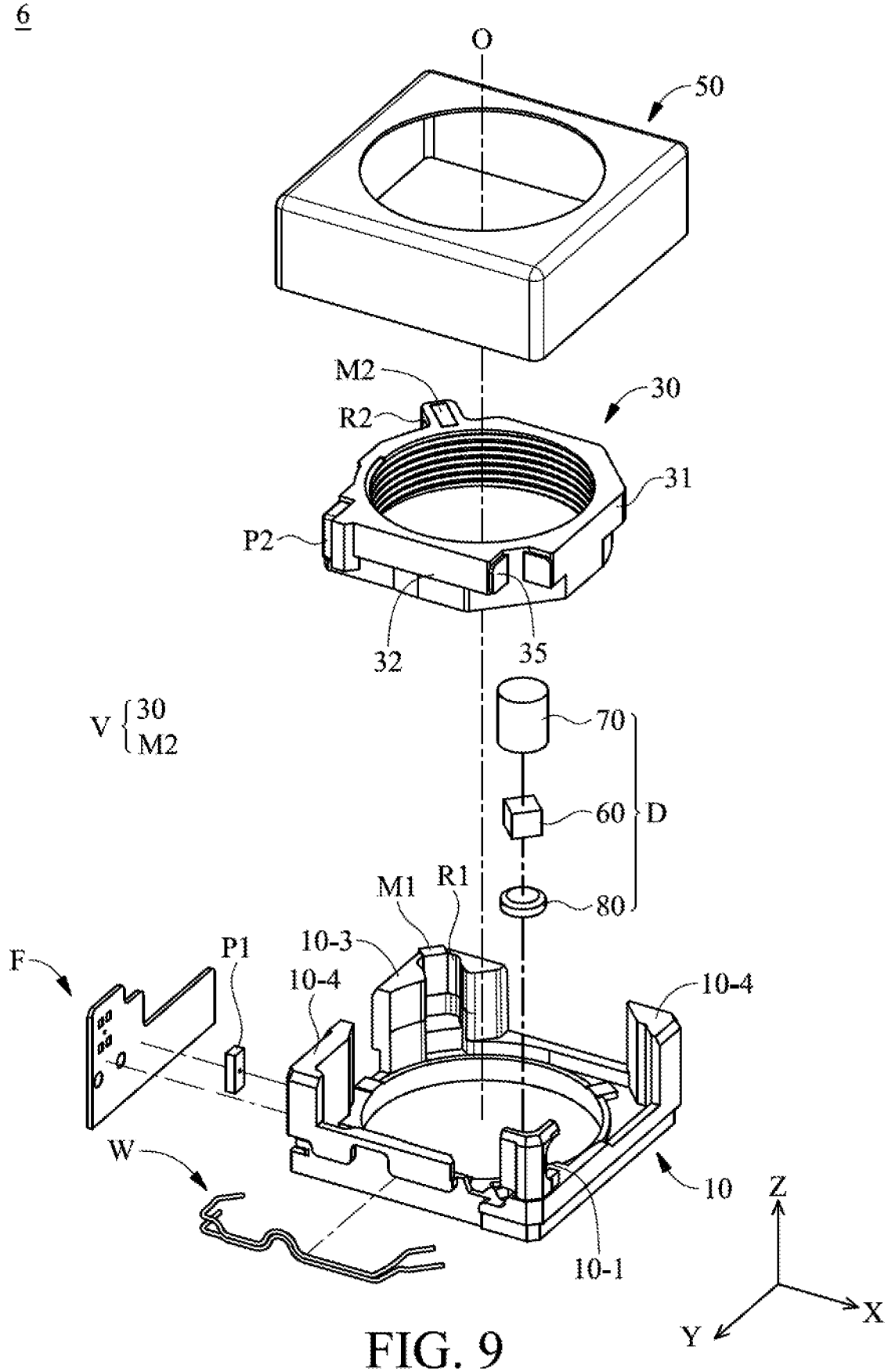
FIG. 9 is a schematic diagram of an optical driving mechanism according to another embodiment of the invention.
Figure 10:
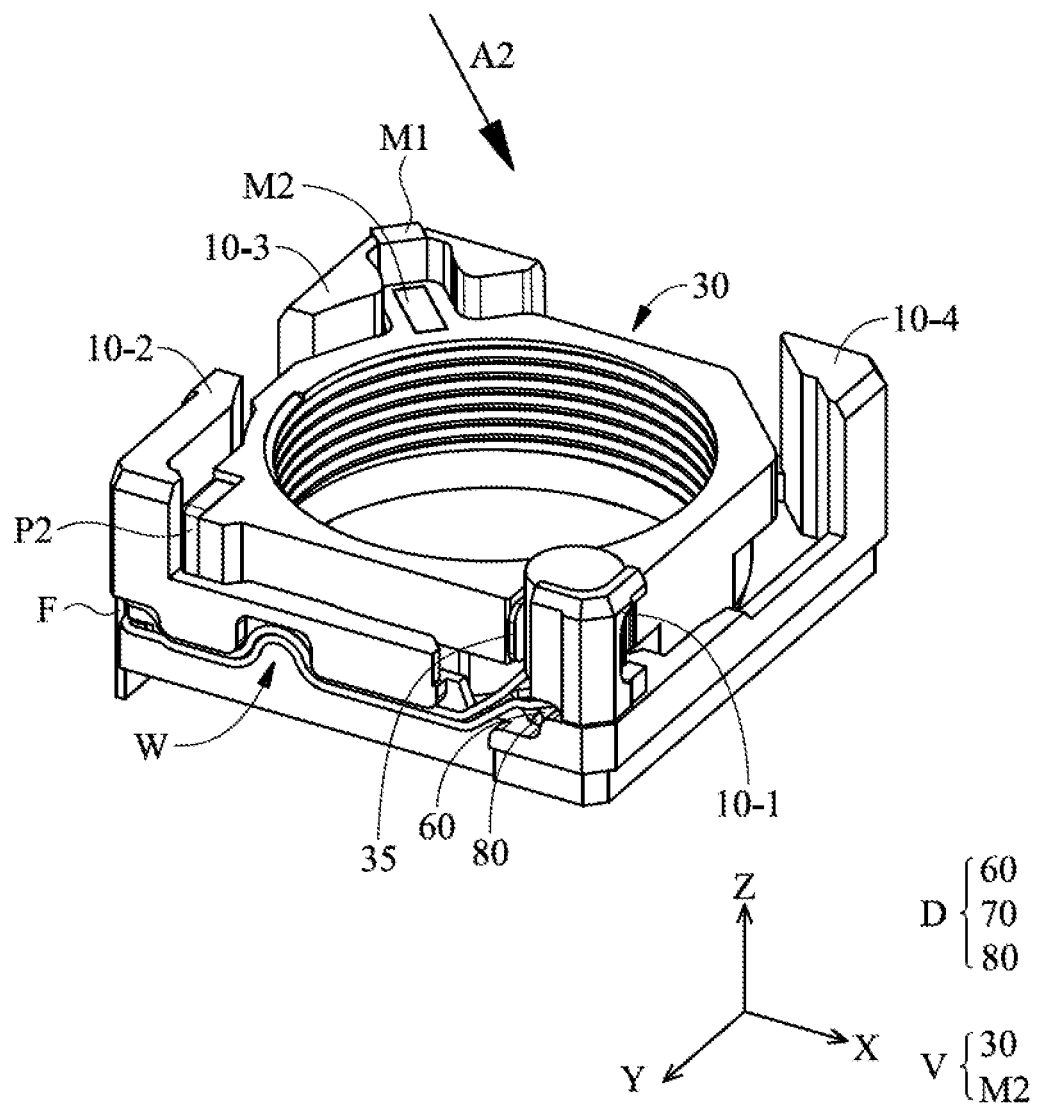
FIG. 10 is a schematic diagram of the optical driving mechanism in FIG. 9 after assembly (the housing 50 is omitted).

FIGS. 9-10 are schematic exploded and after assembly views of the optical driving mechanism 6 according to another embodiment of the present invention (the housing 50 is omitted). The main difference between the optical driving mechanism 6 and the aforementioned optical driving mechanism 1 (FIG. 1) is that the optical driving mechanism 6 comprises a plurality of magnetic elements: the first magnetic element M1 and the second magnetic element M2 are respectively arranged on the recess R1 of the protrusion 10-3 of the base 10 and the protrusion R2 of the holder 30. In addition, the optical driving mechanism 6 does not include the fixing member 40 of the optical driving mechanism 1. Other components are the same or almost the same or have only a slight difference in appearance, which are not described here again.

In detail, referring to FIG. 10, a magnetic repulsion force between the first and second magnetic elements M1 and M2 (e.g., magnets) of the optical driving mechanism 6, so that the holder 30 is toward the arrow direction A2 in FIG. 10 to abut against the support member 70 and the protrusion 10-1 by the first and second magnetic elements M1 and M2 repelling each other. In this way, the support member 70 is sandwiched between the protrusion 10-1 and the holder 30 (the holder 30 makes contact with the support member 70 by the aforementioned magnetic repulsion force), so that the driving portion D including the support member 70 can be steadily clamped.

Embodiment 7

Figure 11:
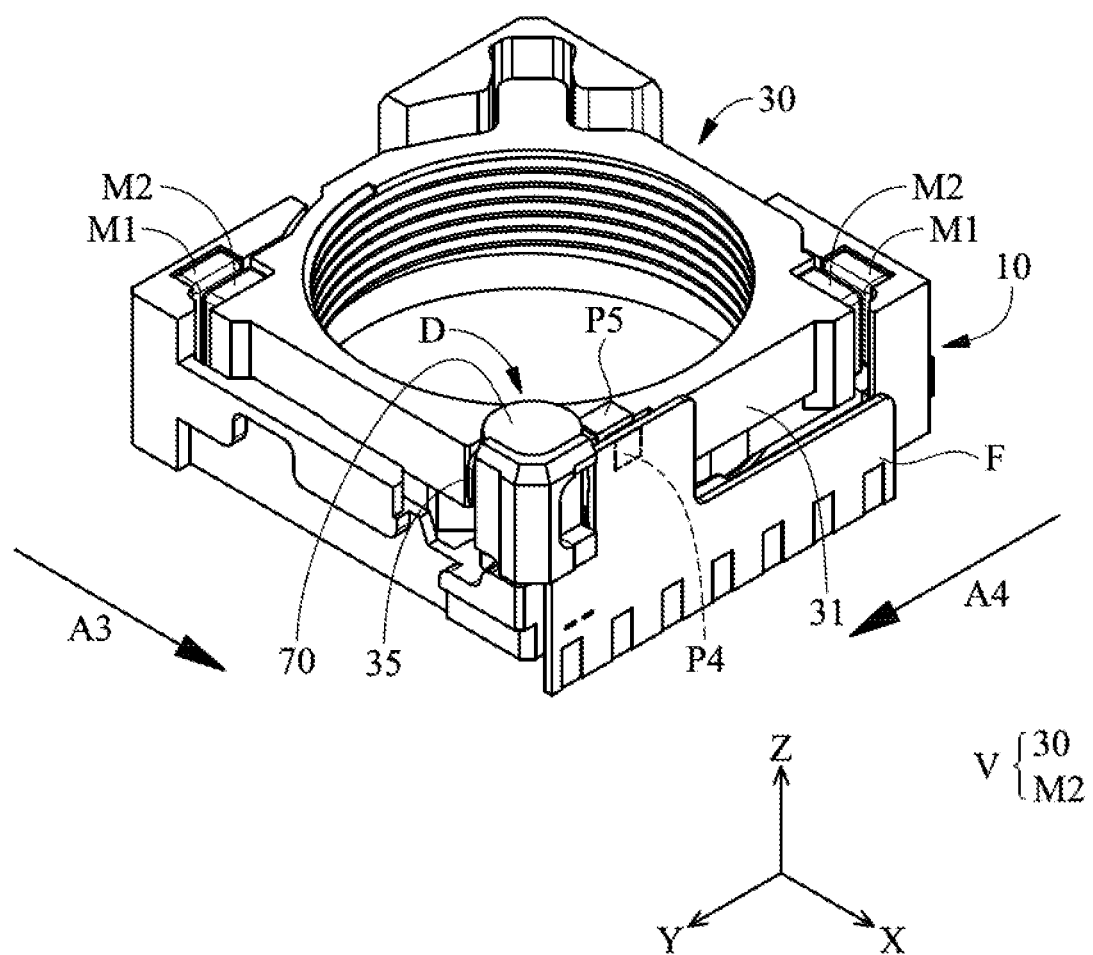
FIG. 11 is a schematic diagram of an optical driving mechanism according to another embodiment of the invention.

FIG. 11 is a schematic diagram of an optical driving mechanism 7 according to another embodiment of the present invention. The main difference between the optical driving mechanism 7 of the present embodiment and the aforementioned optical driving mechanism 6 (FIG. 10) is that the optical driving mechanism 7 has a plurality of first and second magnetic elements M1 and M2. The two first magnetic elements M1 are respectively disposed on the protrusions 10-2 and 10-4, and the two second magnetic elements M2 are disposed on the holder 30 (respectively disposed on different sides of the holder 30) and respectively correspond to the two first magnetic elements M1. Similar to the embodiment shown in FIG. 10, each pair of the first and second magnetic elements M1 and M2 in this embodiment generate a magnetic repulsion force, and theses magnetic repulsion forces provide the holder 30 to press against the support member 70 in the directions A3 and A4 (in different directions), so that the holder 30 tightly abuts the support member 70, and the support member 70 can be stably sandwiched between the holder 30 and the protrusion 10-1. In addition, the circuit board assembly F and the alignment element P4 disposed thereon (corresponding to the alignment element P5 provided on the holder 30) are disposed on the side 31 of the holder 30, that is, they are on the same side as the drive portion D. Thus, the overall volume of the optical driving mechanism 7 can be reduced.

Embodiment 8

Figure 12:
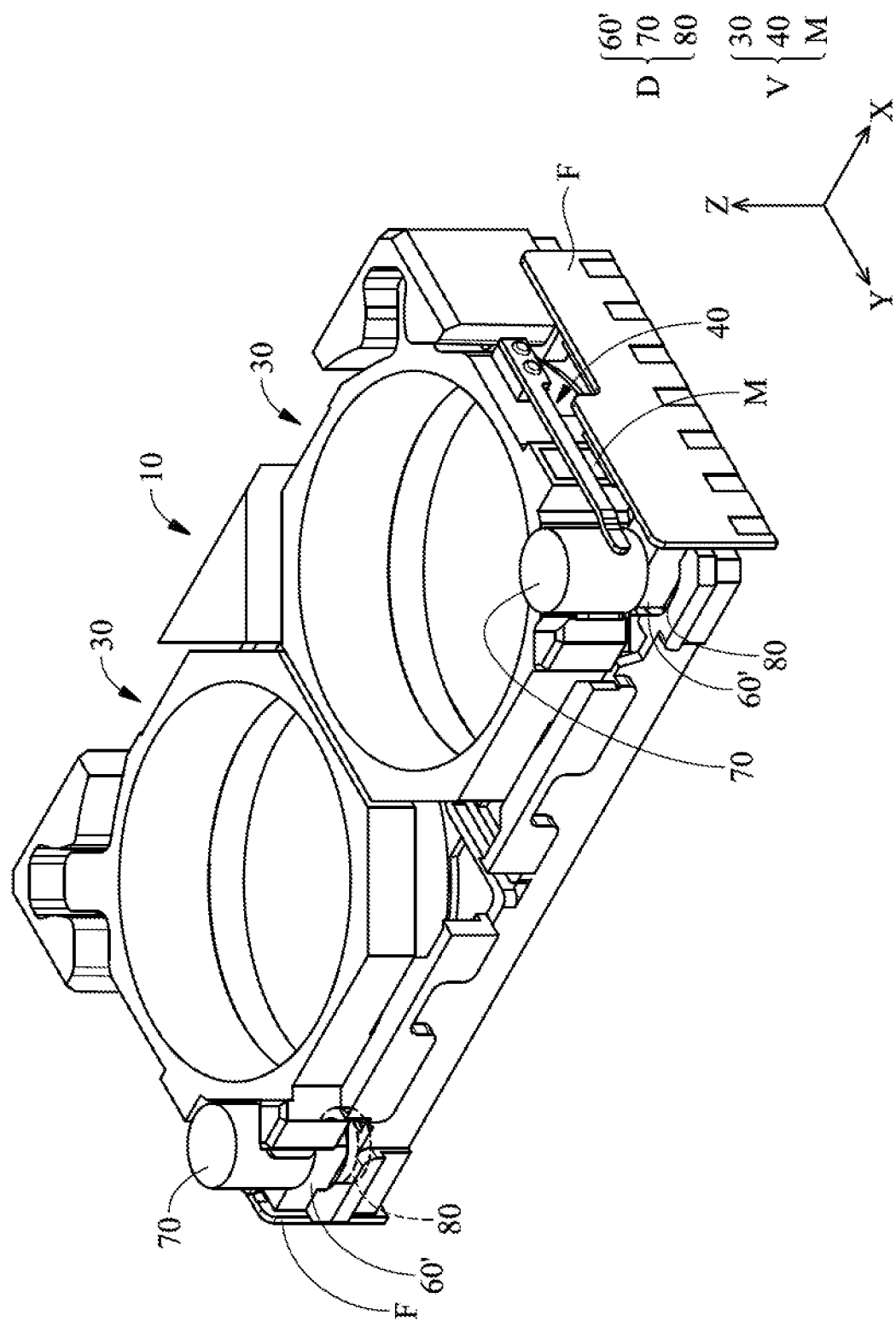
FIG. 12 is a schematic diagram of an optical driving mechanism according to another embodiment of the invention.

FIG. 12 is a schematic diagram of an optical driving mechanism 8 according to another embodiment of the present invention. The optical driving mechanism 8 is configured to sustain and drive a plurality of optical elements. The optical driving mechanism 8 is substantially composed of two of the aforementioned optical driving mechanisms 5 (FIG. 8). The base 10 is configured to carry two movable portions V and two driving portions D. With regard to the arrangement of the optical driving mechanism 8, as shown in FIG. 12, the two driving portions D are provided on the same side of the base 10 and are respectively located at two adjacent corners of the base 10.

Embodiment 9

Figure 13:
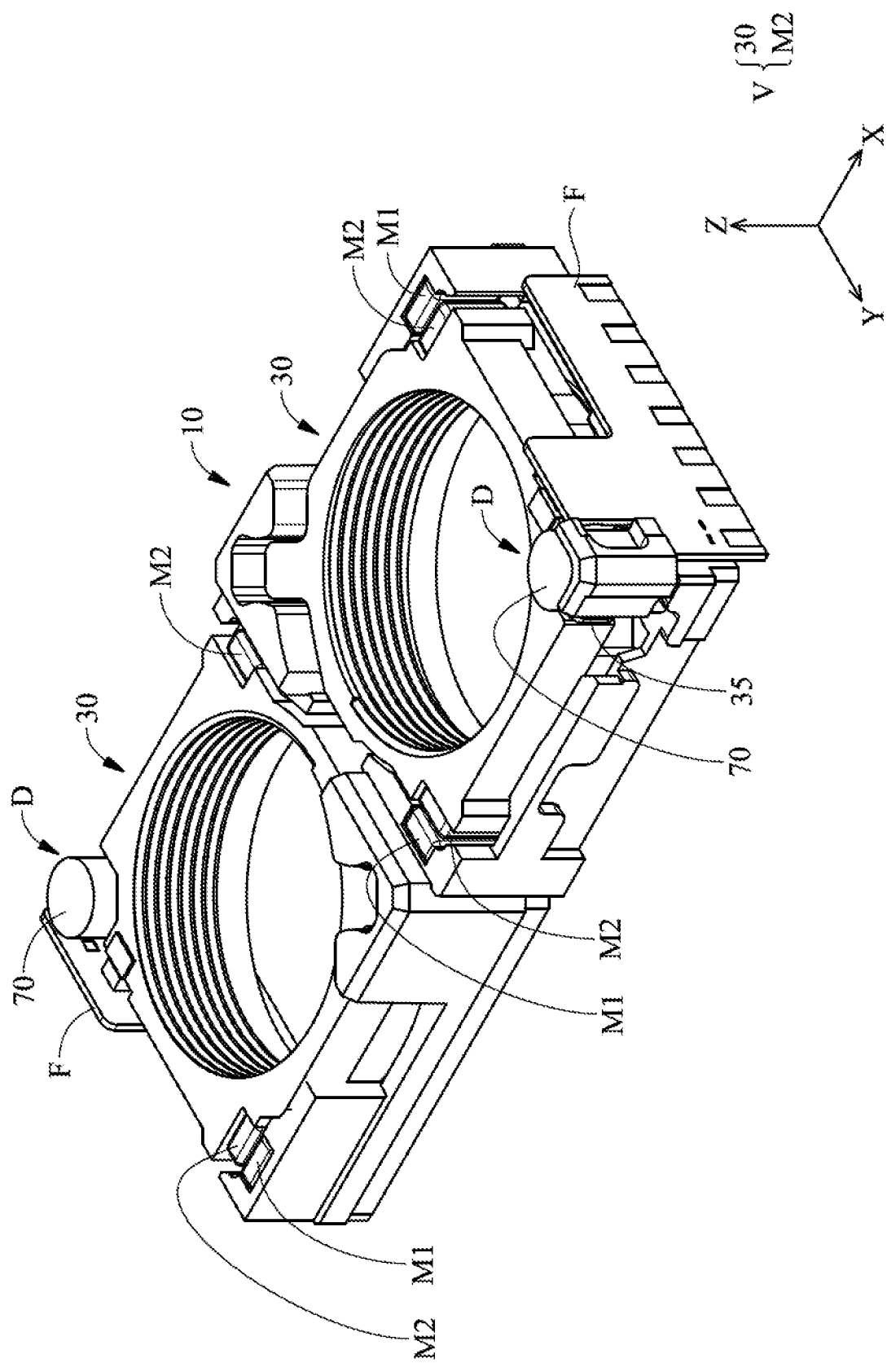
FIG. 13 is a schematic diagram of an optical driving mechanism according to another embodiment of the invention.

FIG. 13 is a schematic diagram of an optical driving mechanism 9 according to another embodiment of the present invention. The optical driving mechanism 9 is configured to sustain and drive a plurality of optical elements. The optical driving mechanism 9 is substantially composed of two of the aforementioned optical driving mechanisms 7 (FIG. 11). The base 10 is configured to carry two movable portions V and two driving portions D. With regard to the arrangement of the optical driving mechanism 9, as shown in FIG. 13, the two drive portions D are provided on different sides of the base 10 and are located substantially at two corners of the base 10 which are diagonally opposite to each other (obliquely).

Embodiment 9X

Figure 14:
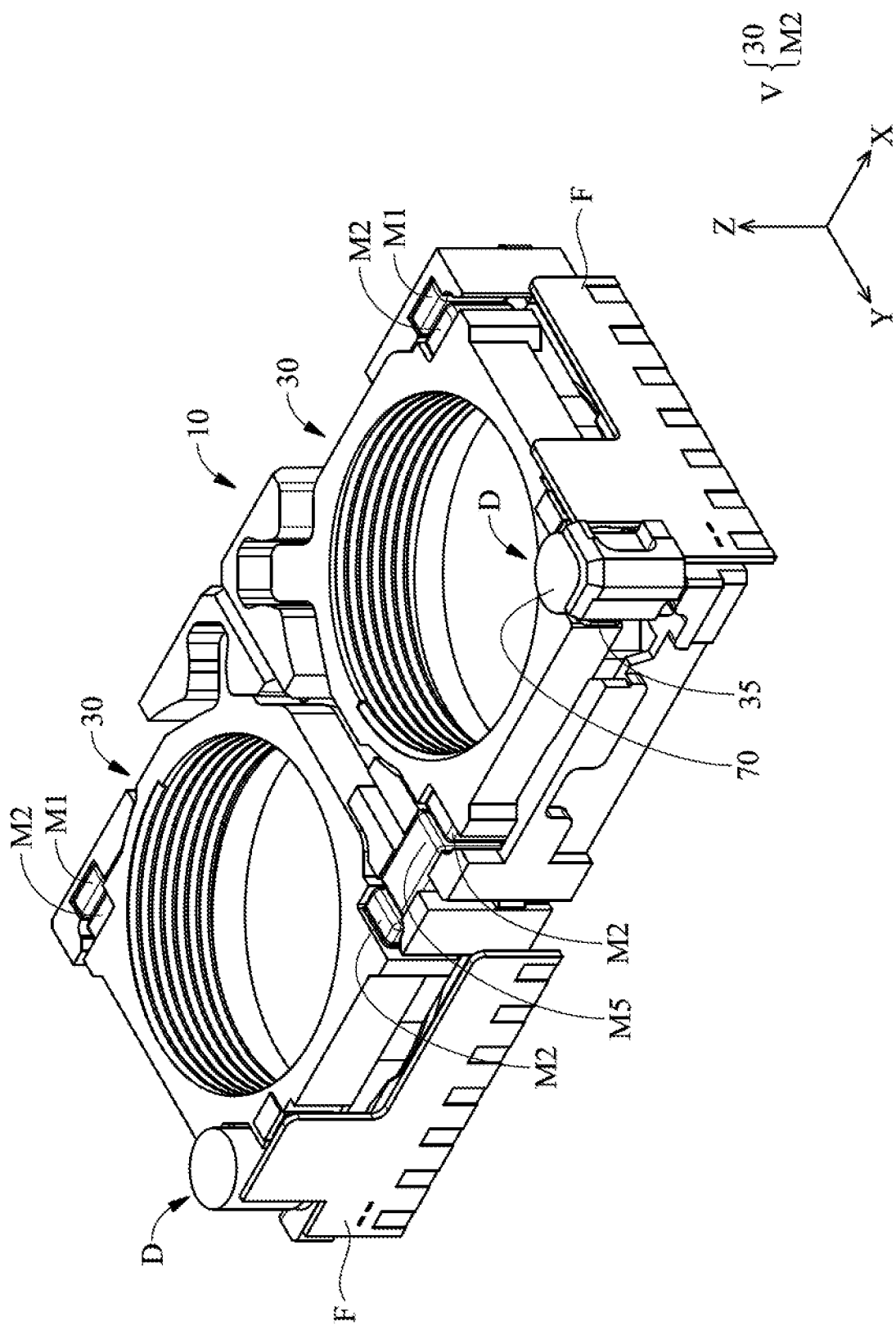
FIG. 14 is a schematic diagram of an optical driving mechanism according to another embodiment of the invention.

FIG. 14 is a schematic view of an optical driving mechanism 9X according to another embodiment of the present invention. The optical driving mechanism 9X is configured to sustain and drive a plurality of optical elements. The optical driving mechanism 9X is similar to the aforementioned optical driving mechanism 9 (FIG. 13). The main difference is that the optical driving mechanism 9X comprises a common magnetic element M5 disposed between the two holders 30. The opposite sides of the common magnetic element M5 respectively correspond to the two magnetic elements M2 respectively provided on the two holders 30. The number of magnetic elements in the mechanism can be reduced by using the common magnetic element M5, so as to reduce production and assembly costs.

In summary, the present invention provides an optical driving mechanism, configured to force an optical element, comprising a base, a movable portion, and a driving portion. The movable portion is disposed and connected to the base, including a holder configured to sustain the optical element, a magnetic element, and a fixing member. The magnetic element and the fixing member are affixed to the holder, wherein the fixing member has or is made of a permeable material. The driving portion is configured to force the movable portion to move relative to the base, wherein the driving portion includes a piezoelectric element and a support member connected thereto. The piezoelectric element and the support member are disposed on the base and connected to the movable portion. The fixing member makes contact with the support member via a magnetic attraction force between the magnetic element and the fixing member. As a result, the occurrence of permanent deformation of the fixing member due to external impact which results in the inability to hold or contact with the drive portion can be avoided or reduced, which greatly improves the optical driving mechanism. In another embodiment, the optical driving mechanism comprises a plurality of magnetic elements: the first and second magnetic elements which are respectively disposed on the base and the holder, wherein the holder makes contact with the support member by a magnetic repulsion force between the first and second magnetic elements so that the holder abuts against the driving portion stably.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, configured to drive an optical element, comprising:
   a base;
   a movable portion, connected to the base, including:
      a holder, configured to sustain the optical element;
      a magnetic element, disposed on the holder; and
      a fixing member, having a permeable material and disposed on the holder; and
   a driving portion, configured to drive the movable portion to move relative to the base, including:
      a piezoelectric element; and
      a support member, connected to the piezoelectric element, wherein the piezoelectric element and the support member are disposed on the base and connected to the movable portion,
   wherein the fixing member makes contact with the support member via a magnetic attraction force between the magnetic element and the fixing member;
   wherein the magnetic element is fully covered by the fixing member in a direction that is perpendicular to an optical axis of the optical element, and the optical driving mechanism further comprises a plurality of fixing members disposed on the side of the holder, and the fixing members and the sliding member form at least three contact areas.

2. The optical driving mechanism as claimed in claim 1, wherein the fixing member has a fixing portion, a corresponding portion and a contact portion, the fixing portion is affixed to the holder, the corresponding portion and the magnetic element are attracted to each other via the magnetic attraction force, and the contact portion makes contact with the support member, wherein the corresponding portion is situated between the fixing portion and the contact portion.

3. The optical driving mechanism as claimed in claim 1, wherein the movable portion further includes a sliding member disposed on the holder and in contact with the support member.

4. The optical driving mechanism as claimed in claim 3, wherein the sliding member, the fixing member and the support member form at least three contact areas.

5. The optical driving mechanism as claimed in claim 1, configured to drive a plurality of optical elements, further comprising:
   a plurality of movable portions; and
   a plurality of driving portions,
      wherein the base has a substantially rectangular structure, the driving portions and the movable portions are disposed on the base, and the driving portions are arranged on the same side of the base and situated at two adjacent corners of the base.

6. An optical driving mechanism, configured to drive an optical element, comprising:
   a base, including a first magnetic element;
   a movable portion, connected to the base, including:
      a holder, configured to sustain the optical element;
      a second magnetic element, disposed on the holder and corresponding to the first magnetic element, wherein a magnetic repulsion force exists between the second magnetic element and the first magnetic element; and
   a driving portion, configured to drive the movable portion to move relative to the base, including:
      a piezoelectric element; and a support member, connected to the piezoelectric element, wherein the piezoelectric element and the support member are disposed on the base and connected to the movable portion, wherein the holder makes contact with the support member via the magnetic repulsion force.

7. The optical driving mechanism as claimed in claim 6, wherein the movable portion further includes a sliding member disposed on the holder and in contact with the support member.

8. The optical driving mechanism as claimed in claim 6, wherein the base further includes a plurality of first magnetic elements, the movable portion further includes a plurality of second magnetic elements, each the first magnetic element is correspond to each second magnetic element, and there is a plurality of magnetic repulsion forces in different directions between the first magnetic elements and the second magnetic elements.

9. The optical driving mechanism as claimed in claim 6, configured to drive a plurality of optical elements, further comprising:
   a plurality of movable portions; and
   a plurality of driving portions,
   wherein the base has a substantially rectangular structure, the driving portions and the movable portions are disposed on the base, and the driving portions are arranged on the same side of the base and situated at two adjacent corners of the base.

10. The optical driving mechanism as claimed in claim 6, configured to drive a plurality of optical elements, further comprising:
   a plurality of movable portions; and
   a plurality of driving portions,
   wherein the base has a substantially rectangular structure, the driving portions and the movable portions are disposed on the base, and the driving portions are arranged on the different sides of the base and situated at two diagonal corners of the base.

11. An optical driving mechanism, configured to drive an optical element, comprising:
   a base;
   a movable portion, connected to the base, including:
      a holder, configured to sustain the optical element;
      a magnetic element, disposed on the holder; and
      a fixing member, having a permeable material and disposed on the holder; and
   a driving portion, configured to drive the movable portion to move relative to the base, including:
      a piezoelectric element; and
      a support member, connected to the piezoelectric element, wherein the piezoelectric element and the support member are disposed on the base and connected to the movable portion,
   wherein the fixing member makes contact with the support member via a magnetic attraction force between the magnetic element and the fixing member,
   wherein the fixing member has an L-shaped structure, and one end of the L-shaped structure is corresponding to another magnetic element on the holder.

12. An optical driving mechanism, configured to drive an optical element, comprising:
   a base;
   a movable portion, connected to the base, including:
      a holder, configured to sustain the optical element;
      a magnetic element, disposed on the holder; and
      a fixing member, having a permeable material and disposed on the holder;
   a driving portion, configured to drive the movable portion to move relative to the base, including:
      a piezoelectric element; and
      a support member, connected to the piezoelectric element, wherein the piezoelectric element and the support member are disposed on the base and connected to the movable portion,
   wherein the fixing member makes contact with the support member via a magnetic attraction force between the magnetic element and the fixing member; and
   an alignment element adjacent to the fixing member and corresponding to the magnetic element.

13. The optical driving mechanism as claimed in claim 12, further comprising a circuit board assembly disposed on the base, and the circuit board assembly and the driving portion are located on the same side of the base, wherein the alignment element is disposed on the circuit board assembly.

14. The optical driving mechanism according to claim 13, wherein the piezoelectric element is in direct contact with the circuit board assembly.

* * * * *